(12) United States Patent
Idei et al.

(10) Patent No.: US 7,820,239 B2
(45) Date of Patent: Oct. 26, 2010

(54) METHOD OF MANUFACTURING IRON MEMBER

(75) Inventors: Hiroshi Idei, Tokyo (JP); Yoshiyuki Sugai, Tokyo (JP); Hisao Kamii, Tokyo (JP); Akinori Hashimoto, Tokyo (JP); Masanori Kato, Tokyo (JP)

(73) Assignee: Akebono Brake Industry Co., Ltd, Tokyo (JP)

( * ) Notice: Subject to any disclaimer, the term of this patent is extended or adjusted under 35 U.S.C. 154(b) by 168 days.

(21) Appl. No.: 12/073,085

(22) Filed: Feb. 29, 2008

(65) Prior Publication Data

US 2008/0213610 A1    Sep. 4, 2008

(30) Foreign Application Priority Data

Mar. 2, 2007    (JP) .......................... P.2007-052951

(51) Int. Cl.
*B05D 1/12* (2006.01)

(52) U.S. Cl. ...................................... 427/205; 427/202

(58) Field of Classification Search ................. 427/202, 427/205

See application file for complete search history.

(56) References Cited

U.S. PATENT DOCUMENTS

| | | | | |
|---|---|---|---|---|
| 5,302,414 A | * | 4/1994 | Alkhimov et al. | 427/192 |
| 5,795,626 A | * | 8/1998 | Gabel et al. | 427/458 |
| 6,528,125 B1 | * | 3/2003 | Jackson et al. | 427/459 |
| 6,537,610 B1 | * | 3/2003 | Springer et al. | 427/185 |
| 2003/0219542 A1 | * | 11/2003 | Ewasyshyn et al. | 427/421 |

FOREIGN PATENT DOCUMENTS

JP    2000-054157    *    2/2000

* cited by examiner

*Primary Examiner*—Frederick J Parker
(74) *Attorney, Agent, or Firm*—Finnegan, Henderson, Farabow, Garrett & Dunner, L.L.P.

(57) ABSTRACT

An iron member having a coating film on at least part of its surface is manufactured by a step of projecting zinc particles to the surface of a base material made of an iron material to form a base film, and a step of forming a coating film of resin coating material on at least a part of the base film.

6 Claims, No Drawings

METHOD OF MANUFACTURING IRON MEMBER

This application claims foreign priority from Japanese Patent Application No. 2007-052951 filed on Mar. 2, 2007, the entire contents of which are hereby incorporated by reference.

BACKGROUND OF THE INVENTION

1. Field of the Invention

The present invention relates to a method of manufacturing an iron member, and to an iron member.

More specifically, the invention relates to a method by which an iron member having excellent anticorrosion characteristics is manufactured with simplicity and ease at low cost under low environmental load conditions, and to an iron member manufactured by such a method.

2. Related Art

As disc brake device for a vehicle, a floating caliper type disc brake is known. In general, the floating caliper type disc brake includes a disc-shaped rotor rotating together with a wheel, a pair of friction pads placed on opposite sides of the rotor, a caliper body to which a piston for pressing one of the friction pads against the rotor is accommodated, and a support member that is mounted on the vehicle body side and supports the caliper body so as to slide in an axial direction of the rotor.

The caliper body includes a bridge part astride the rotor, a cylinder part that is mounted on one end of the bridge part and accommodates the piston in a state of allowing its to-and-fro motion, and caliper claws attached to the other end of the bridge part to hold the back of the other friction pad.

The caliper body and the support member included in the disc brake device are generally made of spheroidal graphite cast iron (FCD450-equivalent material), and the surfaces thereof are given zinc plating and hexavalent chromium-containing chromate treatment, thereby acquiring corrosion resistance.

However, hexavalent chromium remaining in a film formed by chromate treatment sparks fears of detrimental effects on human bodies. In addition, there is a possibility that hexavalent chromium is eluted from chromate-treated wastes and accumulates in the surroundings of its dumping ground.

Therefore, a method of forming chemical conversion treatment film comparable to chromate film currently in use is disclosed (See Patent Document 1), wherein zinc-plated steel bolts are washed with water, given acid activation treatment by immersion in a nitric acid solution or hydrochloric acid solution, further washed with water, and then given a kind of chemical conversion treatment by use of a solution containing a trivalent chromium, molybdic acid and phosphoric acid.

According to the method disclosed in Patent Document 1, however, the zinc plating treatment requires large quantities of washing water, so the method has a problem that not only the treatment process becomes troublesome but also the cost of manufacturing rises due to increases in volume of liquid wastes and footprint of facilities.

[Patent Document 1] JP-A-2000-54157

SUMMARY OF THE INVENTION

One or more embodiments of the invention provide a method of manufacturing an iron member having excellent anticorrosion characteristics with simplicity and ease at low cost under low environmental load conditions, and an iron member manufactured by such a method.

In accordance with one or more embodiments of the invention, a method of manufacturing an iron member having a coating film on at least part of its surface is provided with: a step of projecting zinc particles to the surface of a base material made of an iron material to form a base film, and a step of forming a coating film of resin coating material on at least a part of the base film.

In the method, the zinc particles may have an average particle diameter of 0.5 to 2.0 mm.

In the method, the zinc particles may be projected at a speed of 40 to 75 meters per second and a projection angle of 45 to 135 degrees.

In the method, the step of forming the coating film may be performed by powder coating.

In the method, the base film may have a thickness of 0.3 to 3 μm, and the coating film may have a thickness of 15 to 80 μm, respectively.

In the method, a step of forming a film of trivalent chromate may be performed after the step of projecting the base film, and before the process step of forming the coating film.

The manufactured iron member may be a constituent member of a disc brake device.

Moreover, in accordance with one or more embodiments of the invention, an iron member may be manufactured by the above method.

According to one or more embodiments of the invention, a base film is formed by projecting zinc particles to the surface of a base material made of an iron material, and then a coating film of resin coating material is formed on the base film. By these steps, it becomes possible to provide a method of manufacturing an iron member coated with film having excellent anticorrosion characteristics at low cost with simplicity and ease under low environmental load conditions, and it is also possible to provide an iron member manufactured by such a method.

Other aspects and advantages of the invention will be apparent from the following description and the appended claims.

DETAILED DESCRIPTION OF THE EXEMPLARY EMBODIMENTS

An exemplary embodiment of the invention is described below.

A method for manufacturing an iron member having a coating on at least part of the member surface according to the exemplary embodiment includes a step of projecting zinc particles to the surface of a base material made of an iron material to form a base film, and a step of forming a coating film of resin coating material on at least part of the base film.

In the exemplary embodiment, the iron material may be an iron itself or an iron alloy predominantly constituted of iron. The iron alloy may contain carbon, silicon, magnesium, nickel, chromium, molybdenum, copper and so on. Specifically, the iron alloy may be steel or cast iron. Examples of steel include cold reduction steel and stainless steel, and examples of cast iron include gray iron, white iron, mottled iron, spheroidal graphite cast iron, malleable cast iron, and alloyed cast iron.

In the exemplary embodiment, the base film is formed by projecting (shooting) zinc particles to the surface of a base material including the iron material as recited above.

As zinc particles to be projected, it is possible to use particles made of only zinc and particles formed by covering all around seed particles made of iron, an iron alloy or ceramic with zinc.

It is preferable that the zinc particles have a Vickers hardness (HV) of 150 HV or below. When the zinc particles are made of only zinc, their Vickers hardness is preferably from 40 to 60 HV.

The average particle diameter of zinc particles is preferably from 0.5 to 2.0 mm, far preferably from 0.8 to 1.5 mm, further preferably from 1.0 to 1.5 mm.

The projection of zinc particles can be performed by means of existing blasting apparatus, such as shot blasting apparatus allowing projection of a projectile by centrifugal force of a bladed wheel made of a wear-resistant alloy, which is referred to as an impeller.

The projection speed of zinc particles is preferably from 40 to 75 meters per second, far preferably from 40 to 60 meters per second, further preferably from 45 to 50 meters per second. The setting of a projection distance may be made as appropriate according to the size of a material to be treated (a base material made of an iron material). In addition, it is preferable that the projection angle is chosen from the range of about 45° to about 135°.

The thickness of the base film is preferably from 0.3 to 3 μm, far preferably from 0.5 to 1.0 μm.

Formation of stable film in the invention is thought to be achieved by bonding a part of the surface layer of zinc particles to the surface layer of a base material made of an iron material and causing rupture in the surface layer part of the zinc particles at the same time through collision by projection of the zinc particles to the surface of the base material.

Additionally, depending on the projection condition of zinc particles, zinc particles not coming into collision with the base material surface and incapable of serving to form the base film are also present, but it is also possible to reduce the manufacturing cost by recovering these particles and reusing them.

In the present method, as mentioned above, the base film is formed by projecting zinc particles to the base material surface instead of plating the base material surface with zinc. In consequence, not only the manufacturing process can be simplified but also the environmental load traceable to liquid wastes can be lightened. In addition, the manufacturing cost of an iron member can also be reduced by use of low-priced zinc particles and reduction in footprint of facilities. Moreover, the projection of zinc as a metal with a low melting point allows consistent formation of film on the base material without making pin holes.

In the present method, a coating film of resin coating material is formed on at least part of the base film.

An example of a resin usable in the resin coating material is at least one kind of resin selected from thermosetting resins, such as an epoxy resin, a polyester resin, an epoxy resin-polyester resin mixture and an acrylic resin, or thermoplastic resins, such as polyvinyl chloride resins and polyvinyl butyral. And the preferred is a resin material predominantly composed of an epoxy resin or an epoxy resin-polyester resin mixture as a thermosetting resin.

Examples of an epoxy resin usable for the resin coating material in the present method include glycidyl ether resins, such as a product of condensation reaction between bisphenol A and epichlorohydrin and a product of condensation reaction between bisphenol F and epichlorohydrin, glycidyl ester resins, alicyclic epoxy resins, aliphatic epoxy resins, bromine-containing epoxy resins, and epoxy resins of phenol novolak or cresol novolak type. Of these epoxy resins, glycidyl ether resins, such as a product of condensation reaction between bisphenol A and epichlorohydrin and a product of condensation reaction between bisphenol F and epichlorohydrin, are preferred over the others.

Examples of commercially available products of such epoxy resins include EPOTOHTO YD903N, YD128, YD14, PN639, CN701, NT114, ST-5080, ST-5100 and ST-4100D, products of Tohto Kasei Co., Ltd.; EITPA3150, a product of Daicel Chemical Industries, Ltd.; Araldite CY179, PT810, PT-910 and GY6084, products of Ciba-Geigy; DENACOL EX711, a product of Nagase Kasei Kogyo Co., Ltd.; EPICLON 4055RP, N680, HP4032, N-695 and HP7200H, products of DAINIPPON INK AND CHEMICALS, INCORPORATED; EPIKOTE 1001, 1002, 1003, 1004 and 1007, products of Yuka-Shell Epoxy Co., Ltd.; DER662, a product of The Dow Chemical Company; and EPPN201, EPPN201, EOCN1020 and EOCN102S, products of Nippon Kayaku Co., Ltd.

Examples of a polyester resin used for the resin coating material in the invention include resins synthesized by polymerizing polyhydric alcohol compounds, such as ethylene glycol, propanediol, hexanediol, neopentyl glycol, trimethylolpropane and pentaerythritol, and carboxylic acids, such as maleic acid, terephthalic acid, isophthalic acid, phthalic acid, succinic acid, glutaric acid, adipic acid, sebacic acid and oxypropionic acid, in accordance with ordinary method.

As to those polyester resins each, the number-average molecular weight is preferably from 500 to 100,000, far preferably from 2,000 to 80,000, the hydroxyl value is preferably from 0 to 300 mgKOH/g, far preferably from 30 to 120 mgKOH/g, the acid value is preferably from 0 to 200 mgKOH/g, far preferably from 10 to 100 mgKOH/g, and the melting point is preferably from 50° to 200° C., far preferably from 80° to 150° C.

Examples of commercially available products of such polyester resins include CRYLCOAT 341, 7620 and 7630, products of Daicel UCB Co., Ltd.; FINEDIC GV110 and 230, products of DAINIPPON INK AND CHEMICALS, INCORPORATED; UPICACOAT GV110 and 230, products of JAPAN U-PICA COMPANY, LTD.; ER6570, a product of Nippon ESTER Co., Ltd.; and VESTAGON EP-P100, a product of Huels AG.

The epoxy resin-polyester resin mixtures can be compositions obtained by mixing the epoxy resins as recited above and the polyester resins as recited above in proper amounts. The amount of polyester resin mixed in the epoxy resin-polyester resin mixtures each is preferably from 10 t 90 mass %, far preferably from 20 to 70 mass %, further preferably from 30 to 50 mass %, based on the total composition amount.

The acrylic resins can be polymers of acrylic acids or their derivatives, or copolymers of acrylic acids or their derivatives and other monomers. Examples of such resins include resins obtained by subjecting acrylic acids or their derivatives, such as acrylic acid, methacrylic acid, methyl methacrylate, ethyl methacrylate, glycidyl acrylate and n-butyl acrylate, or combinations of such monomers and other monomers, such as styrene, to radical polymerization with the aid of a radical initiator, such as azobisisobutyronitrile or benzoyl peroxide. One example of such acrylic resins is SANPEX PA-70, a product of Sanyo Chemical Industries, Ltd.

The polyvinyl chloride resins include homopolymer of vinyl chloride monomer and copolymers of vinyl chloride monomer and other monomers, and their commercially-available products of various types can be used. Examples thereof include products of V-Tech Corporation, Kaneca Corporation, Shin-Etsu Chemical Co., Ltd., Shin Dai-Ichi Vinyl corporation, Taiyo Embi Co., Ltd. and TOSOH CORPORATION. Examples of a vinyl chloride monomer usable in the case of synthesizing polyvinyl chloride by polymerizing vinyl chloride monomer in accordance with a granular or emulsion polymerization method include products of V-Tech Corporation, Kajima Embi Monomer K.K., Kaneca Corporation, Keiyo Monomer Co., Ltd., TOSOH CORPORATION and TOKUYAMA Corp.

The polyvinyl butyral is a polymer prepared by adding butyl aldehyde to polyvinyl alcohol, and an example thereof is S-LEC, a product of SEKISUI CHEMICAL CO., LTD.

When the resin coating material used in the present method contains a thermosetting resin, it may further contain a curing agent. Examples of a curing agent usable therein include curing agents of polyamine type, aminoamide type, blocked isocyanate type, triglycidyl isocyanurate (TGIC) type, and epoxy type (e.g., polyepoxide, epoxy resin). Of these agents, curing agents of polyamine type, aminoamide type and blocked isocyanate type are particularly preferred over the others.

Examples of a curing agent of polyamine type include (1) aliphatic polyamines, such as diethylenetriamine, triethylenetetramine, tetraethylenepentamine, dimethylaminopropylamine, trimethylhexamethylenediamine and modified hexamethylenediamine, (2) alicyclic polyamines, such as isophoronediamine and Laromin C-260 (a product of BASF SE), and (3) aromatic polyamines, such as diaminodiphenylmethane, meta-phenylenediamine, diaminodiphenylsulfone and meta-xylylenediamine. In addition, polyoxypropyldiamine and N-aminoethylpiperazine can also be given as examples.

As a curing agent of aminoamide type, the polyaminoamide prepared from a polymerized fatty acid and a polyethylenepolyamine can be used. Examples of the polymerized fatty acid include carboxylic acid dimers, carboxylic acid trimers, polycarboxylic acids of higher order than trimers, and mixtures of these polycarboxylic acids and monocarboxylic acids. And examples of the polyethylenepolyamine include ethylenediamine, diethylenetriamine, triethylenetetramine, and condensates thereof, namely polyaminoimidazolidines.

The curing agent of blocked isocyanate type is a compound whose isocyanate (—NHCO—) groups are blocked in part with a blocking agent, and it is preferable that the compound has a softening point of 200 to 100° C., preferably 25 to 80° C., and an isocyanate-group content on the order of 5% to 30%.

The resin coating material used in the present method may further contain appropriate pigments, such as coloring pigments, rust-inhibiting pigments or extenders. Examples of coloring pigments include titanium oxide, iron red, iron oxide, carbon black, Phthalocyanine Blue, Phthalocyanine Green, quinacridone pigments and azo pigments, those of rust-inhibiting pigments include chrome pigments, phosphate pigments and molybdate pigments, and those of extenders include talc, silica, alumina, calcium carbonate and precipitated barium sulfate.

In addition, it is preferable that the resin coating material used in the present method contains a leveling agent (surface conditioning agent) too. Examples of a leveling agent include acrylic polymer resins, such as acrylic oligomers, and silicones, such as dimethylsilicone and methylsilicone. Of these agents, acrylic polymer resins are particularly preferable. Examples of commercially available products of such acrylic polymer resins include MODAFLOW produced by Monsant Kasei Co., Ltd., ACRONAL 4F produced by BASF SE, BYK-360P produced by BYK Chemie, DISPARLON PL540 produced by KUSUMOTO CHEMICALS, Ltd., and CF-1056 produced by Toshiba Silicone Co., Ltd.

The content of a leveling agent is preferably from 0 to 10 mass %, far preferably from 0 to 5 mass %, further preferably from 0 to 1 mass %. By using the leveling agent as recited above, adhesion between the base film and the coating film of resin coating material can be enhanced.

Furthermore, the resin coating material used in the present method can contain a filler too.

The resin coating material used in the present method can be prepared, e.g., by homogeneously kneading various ingredients under heating to make a dispersion, cooling the dispersion, grinding the cooled dispersion to fine particles within a specified size range, and then classifying the particles.

The coating film of resin coating material can be formed according to a powder coating method or a method of spraying a solution prepared by dissolving the coating material in an appropriate solvent, such as water, but formation of the coating film by a powder coating method is preferable.

Examples of a powder coating method include an electrostatic coating method and a fluidized-bed coating method. In the electrostatic coating method, a coating film is formed as follows: A direct-current high voltage on the order of −40 KV to −90 KV obtained from a high-voltage electrostatic generator is applied to powder particles of resin coating material and thereby the powder particles become negatively charged. By electrostatic attraction, the charged particles are made to adhere to the surface of a base film-formed base material to be coated therewith. Thereafter, the particles having adhered are heated by a baking furnace, molten and cured to be formed into a film. In the fluidized-bed coating method, on the other hand, coating film is formed as follows: The powder of resin coating material is air-fluidized inside a fluidized bed in the bottom of which a porous plate is placed, and a material to be coated (a base film-formed base material), which is preheated up to a temperature on the order of 250° to 300° C., is immersed in the fluid of floating powder to make the powder adhere to the material surface, and further the powder adhering to the material surface is fused by heating to form a coating film.

The average particle diameter of powder particles of resin coating material to form the coating film is preferably from 15 to 35 μm, far preferably from 20 to 30 μm, further preferably from 22 to 28 μm. In addition, it is preferable that the proportion of particles having diameters of 50 μm or above is 30 mass % or below, the proportion of particles having diameters of 100 μm or above is 5 mass % or below and the proportion of particles having diameters of 5 μm or below is 15 mass % or below. By rendering the average particle diameter small and the particle diameter distribution narrow, the coating film which is thin in thickness and superior in scorch (heat) treatment suitability can be obtained. The thickness of the coating film is preferably from 15 to 80 μm.

When the coating film is formed by a powder coating method in the present method, no solvents including organic solvents and water is used at all in the coating process. So, no waste-liquid treatment system is needed. In addition, the unused portion of powder coating material in film formation can be recovered and reused, so neither emission of solid wastes nor air pollution is caused and environmental load can be lightened.

The present method may further have a process step of forming a film of trivalent chromate between the process step of forming the base film and the process step of forming the coating film.

The film of trivalent chromate can be formed, e.g., by immersion in a treatment solution, JASCO TRINER TR-173 produced by NIPPON HYOMEN KAGAKU KABUSHIKI KAISHA.

Subsequently to the chromate treatment, the base material is brought to the process of formation of the coating film of resin coating material. Since the base material surface has a film of trivalent chromate, adhesion between the base material and the coating film can be improved.

Then, the iron member according to the invention is described.

The present iron member is characterized by its manufacturing method according to the invention. The present iron member can be manufactured suitably by the present manufacturing method for an iron member.

EXAMPLES

The exemplary embodiment of the invention will now be described in more detail by reference to the following examples, but these examples should not be construed as limiting the scope of the invention in any way.

Example 1

(1) Process Step of Forming Base Film

As a base material of an iron material, SPCC (cold rolling steel sheet: 100 mm long by 100 mm wide by 3.6 mm high) was used. This steel sheet was thoroughly washed with an organic solvent (acetone), and then degreased by 30 minutes' heating in an 80° C. constant-temperature oven.

Into both principal surfaces of the degreased SPCC, particles constituted of zinc alone (the average particle size: 1.5 mm, Vickers hardness: 50 HV) were projected in a total amount of 15 kg at a speed of 45 meters per second in the vertical direction from the above by means of impeller-type shot blasting apparatus, thereby forming base film.

The base-film thicknesses at 5 points on each principal surface of the SPCC with the thus formed base film were in the range of 0.5 to 1.0 μm as measured with an electrolytic film thickness meter (EF-1000, made by Densoku Instruments Co., Ltd.).

In addition, whether pinholes were present or not on the principal surfaces of the base film-formed SPCC was checked by placing on the principal surfaces filter paper impregnated with a ferroxyl solution (a solution containing potassium ferrocyanide, potassium ferricyanide and sodium chloride) according to the ferroxyl testing method. In the test, no blue spot caused by a pinhole was observed.

(2) Process Step of Forming Coating Film

An iron member having a coating film on the whole principal surface was made by depositing a resin powder coating material (containing 98.8 mass % of a mixture of a polyester resin-blended epoxy resin with a blending proportion of 50 mass % (JER1055, a product of Japan Epoxy Resin Co., Ltd.) and a polyester resin having acid terminals (UPICACOAT GV-230, a product of JAPAN U-PICA COMPANY, LTD.), 0.5 mass % of benzoin (a product of DAIKI SANGYO), 0.1 mass % of 2-methylimidazole (a product of SHIKOKU CHEMICALS CORPORATION), 1 mass % of carbon black as pigment and 0.6 mass % of a leveling agent (ACRONAL 4F, a product of BASF SE) on the principal surface of the base film-formed SPCC in accordance with an electrostatic coating method (corona charging system), and then forming the deposited coating material into a coating film through fusion and curing under 20 minutes' heating at 180° C. in a constant-temperature oven.

(3) Evaluation of Iron Member

Evaluations of thickness, acid resistance and alkali resistance of the coating film were made on the thus obtained iron member in accordance with the methods described below, and besides, an evaluation of corrosion resistance was made on the member by salt spray testing.

(Film Thickness)

The thickness of the coating film at each of 5 points on the principal surface of the iron member was measured with an electromagnetic coating thickness tester (LE-300J, made by Kett Electric Laboratory). The measured values were within the range of 28 to 40 μm.

(Acid Resistance)

A 10% sulfuric acid solution in a volume of 0.2 mL was dropped onto the principal surface of the iron member, and the resulting iron member was allowed to stand for 4 hours in the atmosphere adjusted to a temperature of 20° C.±1° C. and a relative humidity of 73±5%, and then the surface condition of the iron member was observed. Therein, neither distinct discoloration, nor stain, nor swelling was perceived.

(Alkali Resistance)

A 5% sodium hydroxide solution in a volume of 0.2 mL was dropped onto the principal surface of the iron member, and the resulting iron member was allowed to stand for 4 hours in the atmosphere adjusted to a temperature of 20° C.±1° C. and a relative humidity of 73±5%, and then the surface condition of the iron member was observed. Therein, neither distinct discoloration, nor stain, nor swelling was perceived.

(Salt Spray Testing)

The coated surface was cut in a grid pattern, and subjected to the salt spray testing in conformance with JIS S-2371. Results obtained are shown in Table 1.

Example 2

The base film-formed SPCC prepared in Example 1 (1) was dipped for 20 seconds in a room-temperature trivalent chromate treatment solution (a treatment solution, JASCO TRINER TR-173, produced by NIPPON HYOMEN KAGAKU KABUSHIKI KAISHA), and washed with water. Then, water droplets were eliminated from the resulting SPCC by air blow, and further drying was carried out. Thus, the member having a trivalent chromate film on the whole surface was obtained. Thereafter, coating film was formed on the trivalent chromate film in the same manner as in Example 1 (2), thereby making an iron member. Herein, however, no leveling agent was added to a powder coating material used at the time of coating film formation.

The iron member obtained was subjected to the salt spray testing according to the same method as in Example 1 (3). Results obtained are shown in Table 1.

Comparative Example 1

SPCC (cold rolling steel sheet: 100 mm long by 100 mm wide by 3.6 mm high) was used as a base material of a iron material, and the base material was given each of the following treatments (1) to (4) in succession, namely (1) degreasing treatment with an alkali (main component: sodium hydroxide)

(2) washing treatment with an acid (main component: hydrochloric acid), (3) electrogalvanizing treatment with a zinc chloride-ammonia bath, and (4) trivalent chromate treatment with JUSCO TRINER TR-173A, a treatment solution produced by NIPPON HYOMEN KAGAKU KABUSHIKI KAISHA.

Thus, galvanized film and chromate film were formed on the SPCC in the order of mention, thereby making an iron member.

The thickness of the galvanized film at each of 5 points on the principal surface of the iron member obtained was measured with an electromagnetic coating thickness tester (LE-300J, made by Kett Electric Laboratory). The measured values were within the range of 8 to 16 μm.

In addition, the iron member obtained was subjected to the salt spray testing according to the same method as in Example 1 (3). Results obtained are shown in Table 1.

Comparative Example 2

An iron member was made in the same manner as in Comparative Example 1, except that film of hexavalent chromate was formed by hexavalent chromate treatment in place of the trivalent chromate treatment in Comparative Example 1 (4).

The thickness of the galvanized film at each of 5 points on the principal surface of the iron member obtained was measured with an electromagnetic coating thickness tester (LE-300J, made by Kett Electric Laboratory). The measured values were within the range of 8 to 16 μm.

In addition, the iron member obtained was subjected to the salt spray testing according to the same method as in Example 1 (3). Results obtained are shown in Table 1.

TABLE 1

|  | After Lapse of 96 Hours | After Lapse of 196 Hours | After Lapse of 288 Hours | After Lapse of 400 Hours |
|---|---|---|---|---|
| Example 1 | No change | White rust began to form | White rust formed on 10% of the whole surface | Red rust began to form |
| Example 2 | No change | No change | White rust began to form | White rust formed on 20% of the whole surface |
| Comparative Example 1 | White rust began to form | White rust formed on 20% of the whole surface | Red rust began to form | Red rust formed on 30% of the whole surface |
| Comparative Example 2 | White rust began to form | White rust formed on 15% of the whole surface | White rust formed on 30% of the whole surface | Red rust formed on 15% of the whole surface |

When Examples 1 and 2 are put in contrast with Comparative Examples 1 and 2, it is recognized that since the base film is formed on a base material surface by projection of zinc particles in the present method instead of forming film by galvanization, not only the manufacturing process can be simplified but also the environmental load traceable to liquid wastes can be lightened. In addition, the use of low-priced zinc particles and reduction in footprint of facilities allow reduction in manufacturing cost of an iron member. Furthermore, it has been shown that the projection of zinc as a metal with a low melting point made it possible to stably form film on a base material without making pinholes. Besides, as can be seen from Table 1, the iron members obtained in Examples according to the invention had high corrosion resistance.

According to the invention, a method of manufacturing an iron member having excellent anti-corrosive properties with simplicity and ease at low cost under low environmental load conditions and the iron member prepared in accordance with such a method can be provided.

While description has been made in connection with the specific exemplary embodiment and the examples of the present invention, it will be obvious to those skilled in the art that various changes and modification may be made therein without departing from the present invention. It is aimed, therefore, to cover in the appended claims all such changes and modifications falling within the true spirit and scope of the present invention.

What is claimed is:

1. A method of manufacturing an iron member having a coating film on at least part of its surface, comprising:
    a step of projecting zinc particles to the surface of a base material made of an iron material to form a base film by a shot blasting apparatus, the zinc particles having an average particle diameter of 0.5 to 2.0 mm; and
    a step of forming a coating film of resin coating material on at least a part of the base film.

2. The method according to claim 1, wherein the zinc particles are projected at a speed of 40 to 75 meters per second and a projection angle of 45 to 135 degrees.

3. The method according to claim 1, wherein the step of forming the coating film is performed by powder coating.

4. The method according to claim 1, wherein the base film has a thickness of 0.3 to 3 μm, and the coating film has a thickness of 15 to 80 μm, respectively.

5. The method according to claim 1, further comprising:
    a step of forming a film of trivalent chromate, performed after the step of projecting the zinc particles when forming the base film, and before the process step of forming the coating film.

6. The method according to claim 1, wherein the manufactured iron member is a constituent member of a disc brake device.

* * * * *